(12) United States Patent
Theriault et al.

(10) Patent No.: US 8,774,986 B1
(45) Date of Patent: Jul. 8, 2014

(54) METHOD, SYSTEM, AND APPARATUS FOR TAKEOFF ROTATION GUIDANCE

(75) Inventors: Ricky J. Theriault, King City, OR (US); Shuncan Chen, Tigard, OR (US)

(73) Assignee: Rockwell Collins, Inc, Cedar Rapids, IA (US)

( * ) Notice: Subject to any disclaimer, the term of this patent is extended or adjusted under 35 U.S.C. 154(b) by 1714 days.

(21) Appl. No.: 11/809,190

(22) Filed: May 31, 2007

(51) Int. Cl.
G05D 1/00 (2006.01)
G05D 1/06 (2006.01)
G05D 3/00 (2006.01)
G06F 7/00 (2006.01)
G06F 17/00 (2006.01)

(52) U.S. Cl.
USPC ............... 701/5; 701/1; 701/3; 701/4; 701/6; 701/8; 701/9

(58) Field of Classification Search
USPC ............... 701/1, 3, 4, 5, 6, 11, 12, 15, 18
See application file for complete search history.

(56) References Cited

U.S. PATENT DOCUMENTS

| | | | | | |
|---|---|---|---|---|---|
| 3,355,733 | A | * | 11/1967 | Mitchell et al. | 342/33 |
| 3,521,227 | A | * | 7/1970 | Izumi et al. | 340/973 |
| 3,521,228 | A | * | 7/1970 | Izumi et al. | 340/973 |
| 3,668,622 | A | * | 6/1972 | Gannett et al. | 340/953 |
| 3,822,047 | A | * | 7/1974 | Schuldt, Jr. | 244/181 |
| 3,967,799 | A | * | 7/1976 | Muller | 244/181 |
| 3,999,007 | A | * | 12/1976 | Crane | 348/123 |
| 4,149,148 | A | * | 4/1979 | Miller et al. | 345/27 |
| 4,247,843 | A | * | 1/1981 | Miller et al. | 340/973 |
| 4,347,572 | A | * | 8/1982 | Berwick et al. | 701/6 |
| 4,390,950 | A | * | 6/1983 | Muller | 701/4 |
| 4,786,905 | A | * | 11/1988 | Muller | 340/975 |
| 4,860,007 | A | * | 8/1989 | Konicke et al. | 340/973 |
| 5,047,942 | A | * | 9/1991 | Middleton et al. | 701/15 |
| 5,136,518 | A | * | 8/1992 | Glover | 701/5 |
| 5,289,185 | A | * | 2/1994 | Ramier et al. | 340/971 |
| 5,420,582 | A | * | 5/1995 | Kubbat et al. | 340/974 |
| 5,844,504 | A | * | 12/1998 | Etherington | 340/973 |
| 5,901,927 | A | * | 5/1999 | Ho | 244/183 |
| 6,057,786 | A | * | 5/2000 | Briffe et al. | 340/975 |
| 6,121,899 | A | * | 9/2000 | Theriault | 340/967 |
| 6,154,151 | A | * | 11/2000 | McElreath et al. | 340/970 |
| 6,533,219 | B2 | * | 3/2003 | Boe | 244/100 R |
| 6,593,858 | B2 | * | 7/2003 | Qureshi | 340/976 |
| 6,686,850 | B2 | * | 2/2004 | Hausmann | 340/967 |

(Continued)

OTHER PUBLICATIONS

Woods et al., Heads UP Display, 2001, CRC Press LLC.*

*Primary Examiner* — Bhavesh V Amin
(74) *Attorney, Agent, or Firm* — Donna P. Suchy; Daniel M. Barbieri

(57) ABSTRACT

The present invention is directed to providing takeoff rotation guidance. A takeoff rotation guidance indicator, including an aircraft reference symbol and a guidance cue, is displayed on a HUD (Head-up Display) of a HGS (Head-up Guidance System). The guidance cue is positioned in relation to the aircraft reference symbol based on a takeoff rotation pitch guidance and a takeoff rotation roll guidance. Thus, pitch and roll guidance information is simply communicated to the pilot of an aircraft. The takeoff rotation pitch guidance and the takeoff rotation roll guidance are calculated differently at different points during takeoff. In an alternative embodiment, the takeoff rotation guidance indicator includes a slip-skid symbol. The slip-skid symbol is positioned relative to aircraft reference symbol, but is displaced by the lateral acceleration of the aircraft. Thus, slip/skid guidance information is simply communicated to the pilot of an aircraft.

19 Claims, 10 Drawing Sheets

(56) References Cited

U.S. PATENT DOCUMENTS

| | | | |
|---|---|---|---|
| 6,720,891 B2 * | 4/2004 | Chen et al. | 340/969 |
| 6,867,711 B1 * | 3/2005 | Langner et al. | 340/979 |
| 6,871,124 B1 * | 3/2005 | McElreath | 701/16 |
| 6,879,887 B2 * | 4/2005 | Gaidelis et al. | 701/7 |
| 6,970,107 B2 * | 11/2005 | Gannett | 340/967 |
| 7,088,264 B2 * | 8/2006 | Riley | 340/963 |
| 7,209,070 B2 * | 4/2007 | Gilliland et al. | 342/26 B |
| 7,219,011 B1 * | 5/2007 | Barber | 701/466 |

* cited by examiner

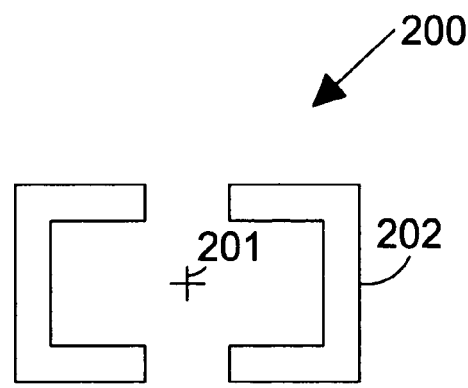
FIG. 2
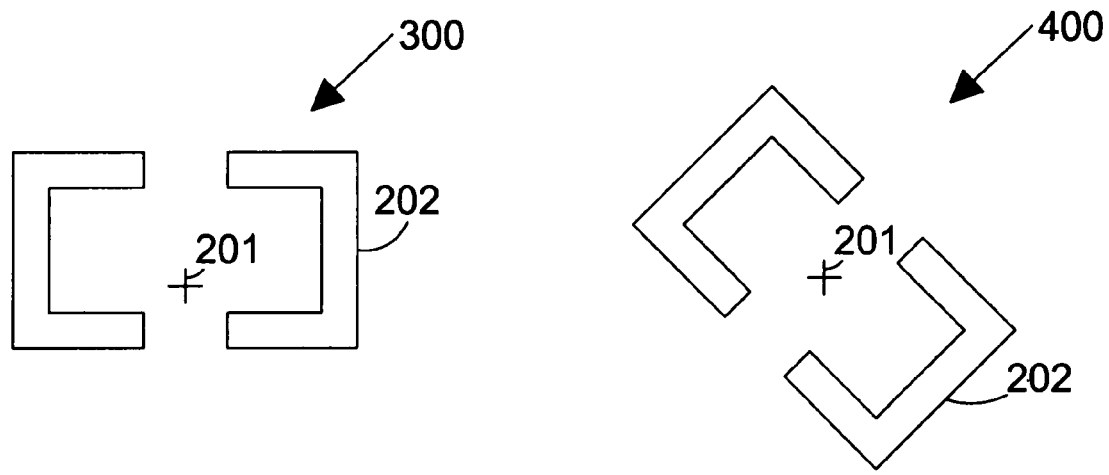
FIG. 3
FIG. 4

METHOD, SYSTEM, AND APPARATUS FOR TAKEOFF ROTATION GUIDANCE

FIELD OF THE INVENTION

The present invention relates generally to guidance systems and more particularly to takeoff rotation guidance.

BACKGROUND OF THE INVENTION

The takeoff phase of flight, especially during low visibility conditions, presents the pilot of an aircraft with a high workload. During takeoff, an aircraft accelerates on a runway to a takeoff rotation speed. Once takeoff rotation speed is reached, the pitch of the aircraft is increased to increase lift from the wings. The aircraft continues to accelerate to a takeoff liftoff speed and the aircraft lifts off the runway. After liftoff, the aircraft performs an initial climbout by climbing to a climbout altitude whereupon the takeoff phase of the flight is over and the aircraft begins climbing to its cruise altitude. A number of conditions must be monitored by a pilot during takeoff, especially during low visibility conditions, increasing workload for the pilot. High workloads strain pilots. Complications during takeoff such as engine failure conditions in crosswinds may further increase pilot workload. Decreasing pilot workload and strain improves safety and performance.

Head-up Guidance Systems (HGS) provide enhanced situational awareness for pilots in all flight conditions, reducing pilot workload and strain. In HGS, primary flight data is presented in the pilot's forward field of view on the Head-up Display of the HGS. By focusing critical information at optical infinity, the pilot is able to view the information while viewing the outside world view. This enables a pilot to fly very accurately in all conditions, even in turbulence and crosswinds.

Consequently, it would be desirable to provide pertinent guidance information on a HUD during the takeoff phase of flight.

SUMMARY OF THE INVENTION

Accordingly, the present invention is directed to a method, system, and apparatus for providing takeoff rotation guidance.

A takeoff rotation guidance indicator is displayed on a HUD (Head-up Display) of a HGS (Head-up Guidance System) to provide takeoff rotation guidance. The takeoff rotation guidance indicator includes an aircraft reference symbol and a guidance cue. The guidance cue is positioned in relation to the aircraft reference symbol based on a takeoff rotation pitch guidance and a takeoff rotation roll guidance. Thus, pitch and roll guidance information is simply communicated to the pilot of an aircraft who may make appropriate adjustments.

The takeoff rotation pitch guidance and the takeoff rotation roll guidance are calculated differently at different points during takeoff. When the computed airspeed of the aircraft is less than a takeoff rotation speed, the takeoff rotation pitch guidance is zero. When the computed airspeed of the aircraft is greater than the takeoff rotation speed and the altitude of the aircraft is less than a climbout altitude the takeoff rotation pitch guidance is calculated based on a suggested pitch rate, the engine failure status of the aircraft, the pitch of the aircraft, and the pitch rate of the aircraft. When the computed airspeed of the aircraft is less than the takeoff liftoff speed, the takeoff rotation roll guidance is zero. When the computed airspeed of the aircraft is greater than the takeoff liftoff speed and the altitude of the aircraft is less than the climbout altitude the takeoff rotation roll guidance is calculated based on the track error of the aircraft, the yaw rate of the aircraft, the roll angle of the aircraft, and the roll rate of the aircraft.

In an alternative embodiment, the takeoff rotation guidance indicator includes a slip-skid symbol. The slip-skid symbol is positioned relative to aircraft reference symbol, but is displaced by the lateral acceleration of the aircraft. Thus, slip/skid guidance information is simply communicated to the pilot of an aircraft who may make appropriate adjustments, for example, to account for sideslip generated due to an engine failure.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 2 is a diagram illustrating a takeoff rotation guidance indicator, in accordance with an exemplary embodiment of the present invention;

FIG. 3 is a diagram illustrating a takeoff rotation guidance indicator, in accordance with an exemplary embodiment of the present invention;

FIG. 4 is a diagram illustrating a takeoff rotation guidance indicator, in accordance with an exemplary embodiment of the present invention;

DETAILED DESCRIPTION OF THE INVENTION

Reference will now be made in detail to exemplary embodiments of the invention, examples of which are illustrated in the accompanying drawings.

Figure 1:
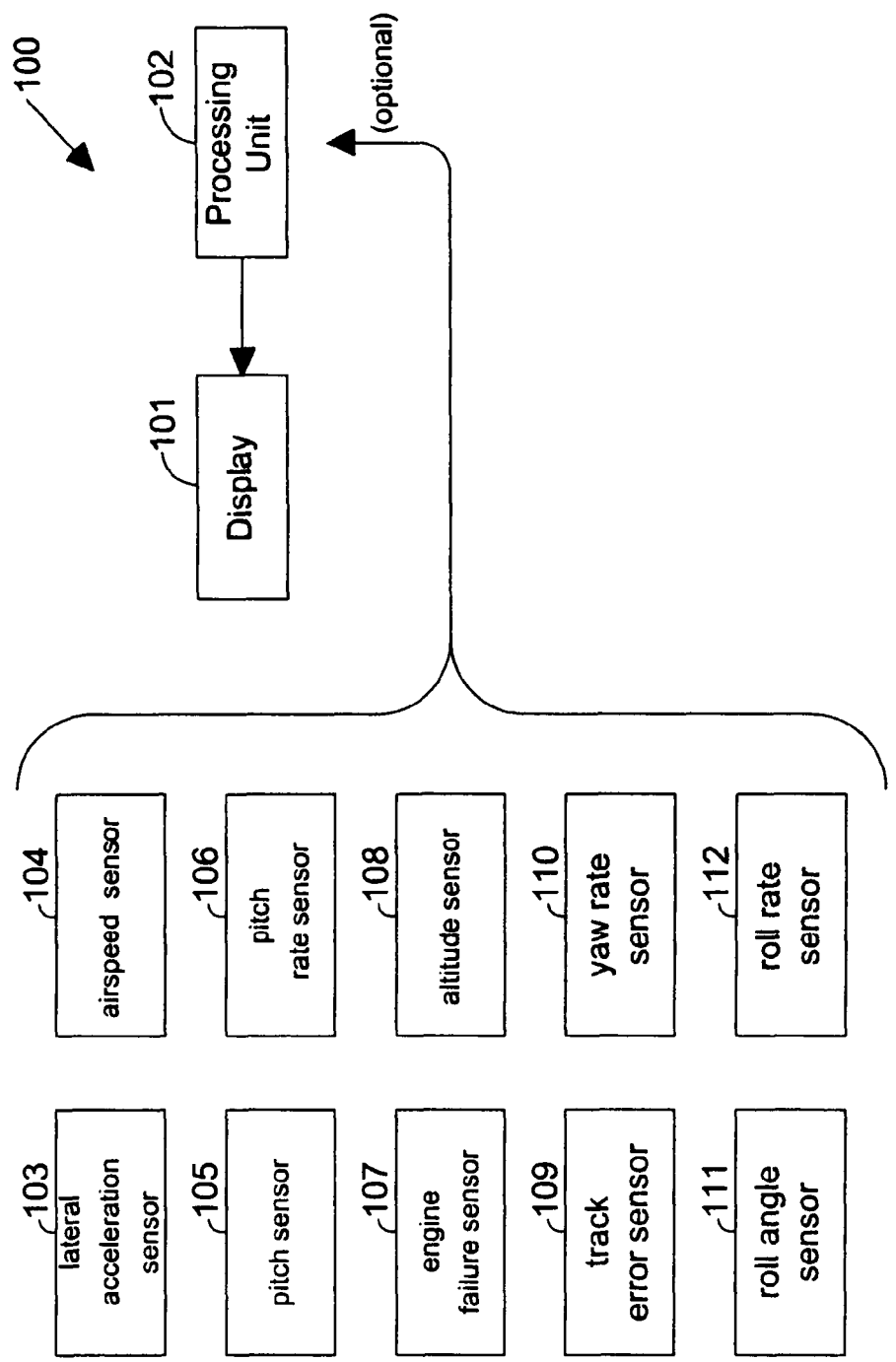
FIG. 1 is a block diagram illustrating a takeoff rotation guidance apparatus, in accordance with an exemplary embodiment of the present invention.

Referring generally to FIG. 1; a takeoff rotation guidance apparatus 100, in accordance with an exemplary embodiment of the present invention, is illustrated. Takeoff rotation guidance apparatus 100 may be incorporated into a HGS (Head-up Guidance System). Takeoff rotation guidance apparatus 100 comprises a display 101 and a processing unit 102 operatively connected to the display 101. Display 101 may comprise any kind of display including, but not limited to, a LCD (liquid crystal display), a LED (light emitting diode) display, a CRT (cathode ray tube) display, and a HUD (Head-up Display). A HUD is any transparent display that presents data in the user's field of vision without obstructing the user's view. Display 101 displays a takeoff rotation guidance indicator to provide takeoff rotation guidance based upon a takeoff rotation pitch guidance and a takeoff rotation roll guidance calculated by processing unit 102.

Takeoff rotation guidance apparatus 100 may include a lateral acceleration sensor 103 operatively coupled to processing unit 102 for receiving the lateral acceleration for an aircraft. Lateral acceleration of an aircraft is the acceleration of the aircraft in the direction of the aircraft's lateral axis (side-to-side). Lateral acceleration of the aircraft may be determined by an inertial reference unit. Takeoff rotation guidance apparatus 100 may include an airspeed sensor 104 operatively coupled to processing unit 102 for receiving the computed airspeed for an aircraft. The speed of an aircraft is the speed of the aircraft through the air. Takeoff rotation guidance apparatus 100 may include a pitch sensor 105 operatively coupled to processing unit 102 for receiving the pitch for an aircraft. The pitch of an aircraft is the rotation of the aircraft around the aircraft's lateral or transverse axis. Takeoff rotation guidance apparatus 100 may include a pitch rate sensor 106 operatively coupled to processing unit 102 for receiving the pitch rate for an aircraft. The pitch rate of an aircraft is the change in the pitch of the aircraft over a period of time. Takeoff rotation guidance apparatus 100 may include an engine failure sensor 107 operatively coupled to processing unit 102 for receiving the engine failure status for an aircraft. The engine failure status of an aircraft is whether one or more of the aircraft's engines have failed. The engine failure status of an aircraft may be determined by an engine status parameter reported by an engine. Alternatively, the engine failure status of an aircraft may be logically determined based upon sensed accelerations and engine thrust decay determination. Takeoff rotation guidance apparatus 100 may include an altitude sensor 108 operatively coupled to processing unit 102 for receiving the altitude of an aircraft. The altitude of an aircraft is the elevation of the aircraft above a terrain. The altitude of the aircraft may be determined utilizing a radio altimeter. Takeoff rotation guidance apparatus 100 may include a track error sensor 109 operatively coupled to processing unit 102 for receiving the track error for an aircraft. The track error of an aircraft is the difference between a reference heading and the aircraft's heading. Takeoff rotation guidance apparatus 100 may include a yaw rate sensor 110 operatively coupled to processing unit 102 for receiving the yaw rate for an aircraft. The yaw rate for an aircraft is the change in the yaw (rotation of the aircraft around the aircraft's vertical axis) of an aircraft over a period of time. Takeoff rotation guidance apparatus 100 may include a roll angle sensor 111 operatively coupled to processing unit 102 for receiving the roll angle for an aircraft. The roll angle of an aircraft is the rotation of the aircraft around the aircraft's longitudinal axis. Takeoff rotation guidance apparatus 100 may include a roll rate sensor 112 operatively coupled to processing unit 102 for receiving the roll rate for an aircraft. The roll rate of an aircraft is the change in the roll angle of the aircraft over a period of time.

Referring now to FIG. 2; a takeoff rotation guidance indicator 200 which may be displayed on the display 101 of the takeoff rotation guidance apparatus 100, in accordance with an exemplary embodiment of the present invention, is illustrated. Takeoff rotation guidance indicator 200 includes an aircraft reference symbol 201 and a guidance cue 202. As illustrated, aircraft reference symbol 201 is shown as a "+". However, aircraft reference symbol 201 may be represented by a point, a shape, text, or any other visual metaphor. As illustrated, guidance cue 202 is shown as a pair of brackets. However, guidance cue 202 may be represented by one or more shapes, letters, or other visual metaphors.

Aircraft reference symbol 201 includes an x position and a y position. Guidance cue 202 includes an x position and a y position relative to the x position and y position of aircraft reference symbol 201. The y position of guidance cue 202 is the y position of aircraft reference symbol 201 plus a takeoff rotation pitch guidance calculated by processing unit 102. As illustrated, the takeoff rotation pitch guidance is zero and guidance cue 202 is positioned centered around aircraft reference symbol 201. Referring now to FIG. 3, the takeoff rotation pitch guidance is a number other than zero and guidance cue 202 is offset from aircraft reference symbol 201 by the takeoff rotation pitch guidance. Thus, pitch guidance information is simply communicated to the pilot of an aircraft who can then make appropriate adjustments.

Guidance cue 202 is rotated around aircraft reference symbol 201 based upon a takeoff rotation roll guidance calculated by processing unit 102. As illustrated in FIG. 2, the takeoff rotation roll guidance is zero and guidance cue 202 is positioned centered around aircraft reference symbol 201. Referring now to FIG. 4, the takeoff rotation roll guidance is a number other than zero and guidance cue 202 has been rotated around aircraft reference symbol 201 based upon the takeoff rotation roll guidance. Thus, roll guidance information is simply communicated to the pilot of an aircraft who can then make appropriate adjustments.

Processing unit 102 may calculate the takeoff rotation pitch guidance and the takeoff rotation roll guidance differently at different points during takeoff. For example, when the computed airspeed of the aircraft if greater than zero but less than the takeoff rotation speed, processing unit 102 may calculate the takeoff rotation pitch guidance to be zero. When the computed airspeed of the aircraft is greater than the takeoff rotation speed but less than the takeoff liftoff speed, or when the computed airspeed is greater than the takeoff rotation liftoff speed and the altitude of the aircraft is less than the climbout altitude for the aircraft, processing unit 102 may calculate the takeoff rotation pitch guidance by: generating a suggested pitch rate, multiplying the suggested pitch rate by an engine failure factor to obtain a product, subtracting the pitch of the aircraft from the product to obtain a difference, and subtracting the pitch rate of the aircraft from the difference.

Also by way of example, when the computed airspeed of the aircraft is greater than zero but less than the takeoff rotation speed, or when the computed airspeed of the aircraft is greater than the takeoff rotation speed but less than the takeoff liftoff speed, processing unit may calculate the takeoff rotation roll guidance to be zero. When the computed airspeed of the aircraft is greater than the takeoff liftoff speed and the altitude of the aircraft is less than the climbout altitude for the aircraft, processing unit 102 may calculate the takeoff rotation roll guidance by: subtracting the yaw rate of the aircraft from the track error of the aircraft to obtain a first difference; subtracting the roll angle of the aircraft from the first difference to obtain a second difference; and subtracting the roll rate of the aircraft from the second difference.

Alternatively, when the computed airspeed of the aircraft is greater than the takeoff rotation speed but less than the takeoff liftoff speed, or when the computed airspeed is greater than the takeoff rotation liftoff speed and the altitude of the aircraft is less than the climbout altitude for the aircraft, processing unit 102 may calculate the takeoff rotation pitch guidance by: generating a suggested pitch rate, passing the suggested pitch rate through a lag function to obtain a first result, multiplying the first result by an engine failure factor to obtain a first product, passing the first product through a limit function to obtain a second result, multiplying the pitch of the aircraft by a gain to obtain a second product and subtracting the second product from the second result to obtain a first difference, passing the pitch rate of the aircraft through a lag function to obtain a third result, multiplying the third result by a gain to obtain a third product, subtracting the third product from the first difference to obtain a second difference, and multiplying the second difference by a gain.

Alternatively, when the computed airspeed of the aircraft is greater than the takeoff liftoff speed and the and the altitude of the aircraft is less than the climbout altitude for the aircraft, processing unit 102 may calculate the takeoff rotation roll guidance by: multiplying the track error of the aircraft by a gain to obtain a first product, passing the yaw rate of the aircraft through a lag function to obtain a first result, multiplying the first result by a gain to obtain a second product, subtracting the second product from the first product to obtain a first difference, passing the first difference through a limit function to obtain a second result, passing the roll angle of the aircraft though a washout function to obtain a third result, multiplying the third result by a gain to obtain a third product, subtracting the third product from the second result to obtain a second difference, multiplying the second difference by a gain to obtain a fourth product, passing the roll rate of the aircraft though a lag function to obtain a fourth result, multiplying the fourth result by a gain to obtain a fifth product, subtracting the fifth product from the fourth product to obtain a third difference, and multiplying the third difference by a gain.

Figure 5:
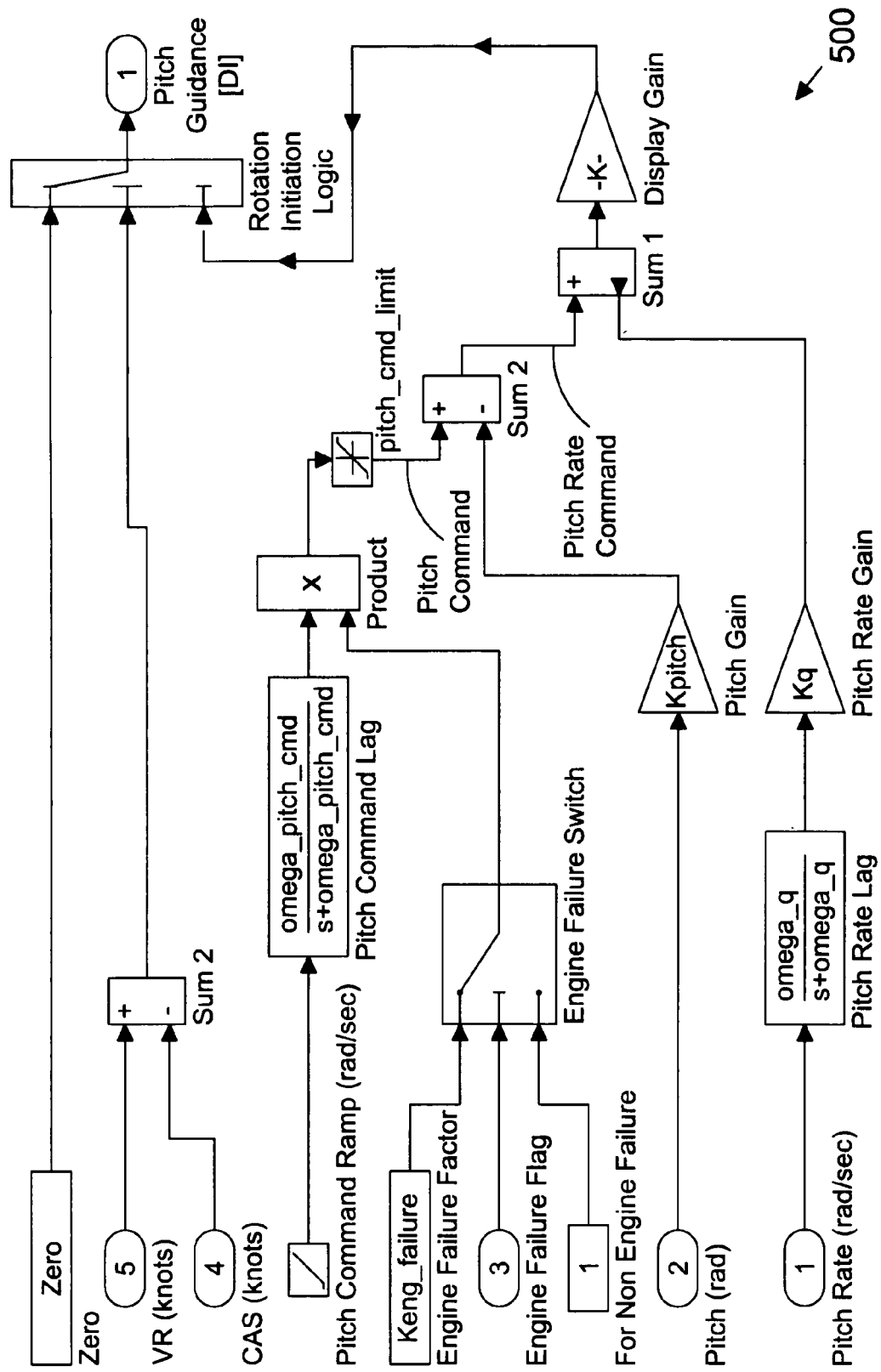
FIG. 5 is a process flow chart illustrating a method of calculating a takeoff rotation pitch guidance, in accordance with an alternative embodiment of the present invention.

Alternatively, processing unit 102 may calculate the takeoff rotation pitch guidance according to the process flow chart illustrated in FIG. 5. With respect to FIG. 5:
Pitch Command Calculation:

$$\text{Pitch Command}=\text{pitch\_cmd\_limit}(\text{Lag}(\text{Pitch Command Ramp})*\text{Engine Failure Factor})$$

Where,
Pitch Command Ramp is a ramp generator with a slope of 3 degrees per second, starting from zero at computed airspeed=takeoff rotation speed
omega_pitch_cmd=3.0 radians/second for the Pitch Command Ramp Lag Filter
To achieve the slope of 3 degrees per second for two engines, or 2.0 degrees per second for one engine, the Engine Failure Factor is calculated as follows:
If (no engine failure) Engine Failure Factor=1.0
Else Engine Failure Factor=0.67
pitch_cmd_limit is a limit function defined as follows:
Lower Limit=0
Upper Limit=pitch_cmd_upper_limit
If (no engine failure) pitch_cmd_upper_limit=15 degrees (or aircraft nominal climbout attitude)
Else pitch_cmd_upper_limit=9 degrees (or aircraft engine out climbout attitude)
Pitch Rate Command Calculation:

$$\text{Pitch Rate Command}=\text{Pitch Angle Command}-\text{Pitch Angle}*\text{Pitch Angle Gain}$$

Where,
Pitch Angle Gain=$K_{pitch}$=1.0
Takeoff Rotation Pitch Guidance Calculation:
If (computed airspeed<takeoff rotation speed) Pitch Guidance=0

$$\text{Else Pitch Guidance}=(\text{Pitch Rate Command}-\text{Lag}(\text{Pitch Rate})*\text{Pitch Rate Gain})*\text{Display Gain}$$

Where,
omega_q=20 radians/second for the Pitch Rate Lag Filter
Pitch Rate Gain=$K_q$=0.5
Display Gain=$K_{display}$=1000

Figure 6:
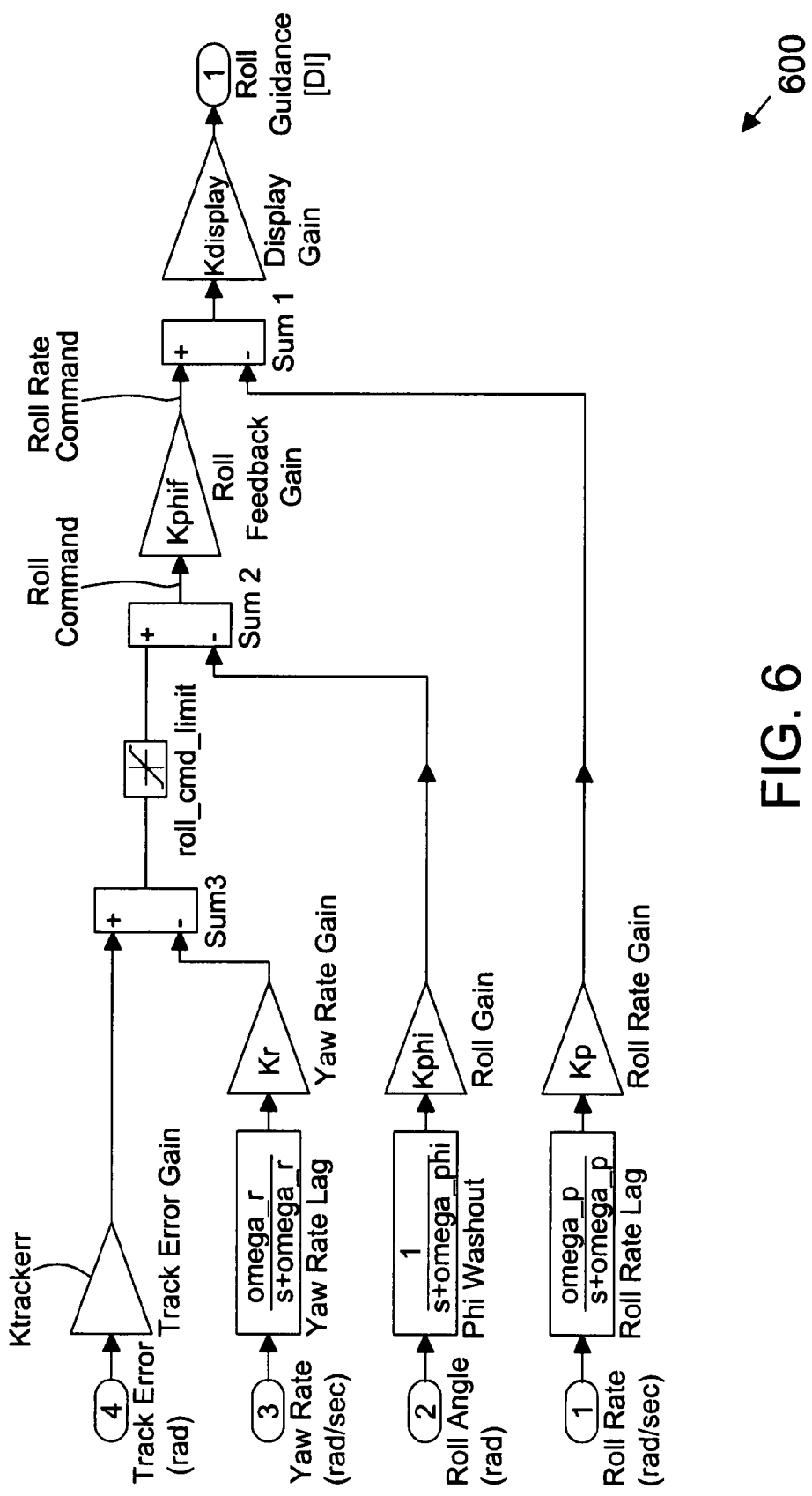
FIG. 6 is a process flow chart illustrating a method of calculating a takeoff rotation roll guidance, in accordance with an alternative embodiment of the present invention.

Alternatively, processing unit 102 may calculate the takeoff rotation roll guidance according to the process flow chart illustrated in FIG. 6 when the computed airspeed of the aircraft is greater than the takeoff liftoff speed and the and the altitude of the aircraft is less than the climbout altitude for the aircraft. With respect to FIG. 6:

$$\text{Roll Command}=\text{roll\_cmd\_limit}(\text{Track Error}*\text{Track Error Gain}-\text{Lag}(\text{Yaw Rate})*\text{Yaw Rate Gain})$$

Where,
Track Error=Track Angle−Selected Course when Selected Course is available or Track Error=Track Angle−Track Angle latched at liftoff when Selected Course is not available
roll_cmd_limit is a limit function, defined as follows:
Upper Limit=Roll Lim*$K_{phi}$;
Lower Limit=−Upper Limit
Roll Lim is scheduled as:
0.5236@150 feet wheel height,
0.1047@30 feet wheel height
$K_{phi}$=0.85
omega_r=20 radians/second for the Yaw Rate Lag Filter
Track Error Gain=$K_{trackerr}$=1.0
Yaw Rate Gain=$K_r$=0.5
Roll Rate Command Calculation:

$$\text{Roll Rate Command}=(\text{Roll Command}-\text{Washout}(\text{Roll Angle})*\text{Roll Gain})*\text{Roll Feed Back Gain}$$

Where,
omega_phi=0.2 radians/second for the Roll Angle Washout Filter
Roll Gain=$K_{phi}$=0.85
Roll Feed Back Gain=$K_{phif}$=0.55
Takeoff Rotation Roll Guidance Calculation:

$$\text{Roll Guidance Command}=(\text{Roll Rate Command}-\text{Lag}(\text{Roll Rate})*\text{Roll Rate Gain})*\text{Display Gain}$$

Where,
omega_p=20 radians/second for the Roll Rate LagFilter
Roll Rate Gain=$K_p$=0.2
Display Gain=$K_{display}$=1.0

Figures 7, 8:
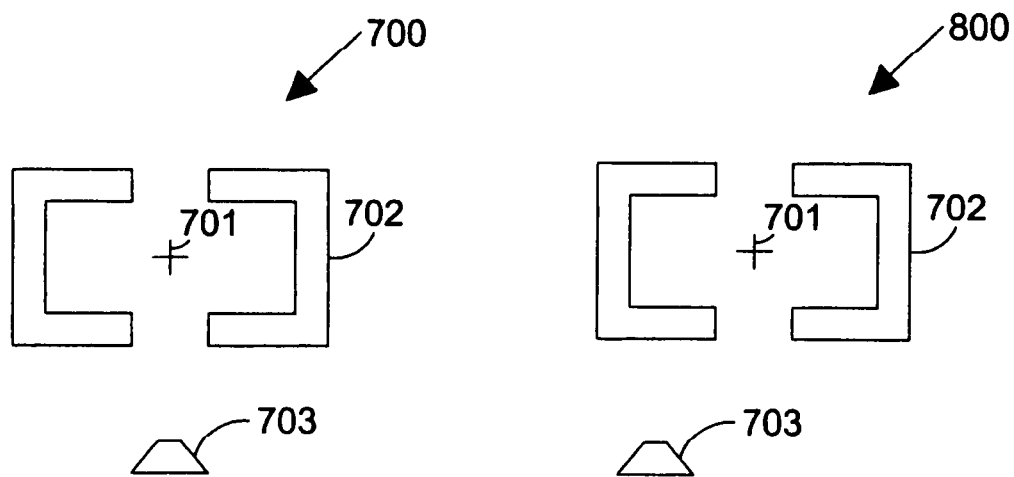
FIG. 7 is a diagram illustrating a takeoff rotation guidance indicator, in accordance with an alternative embodiment of the present invention.
FIG. 8 is a diagram illustrating a takeoff rotation guidance indicator, in accordance with an exemplary embodiment of the present invention.

Referring now to FIG. 7, a takeoff rotation guidance indicator 700 which may be displayed on the display 101 of the takeoff rotation guidance apparatus 100, in accordance with an alternative embodiment of the present invention, is illustrated. Takeoff rotation guidance indicator 700 includes slip-skid symbol 703. A slip is an aerodynamic state where an aircraft if moving laterally as well as forward relative to the oncoming airflow. A skid is a specific type of slip during a turn where the lateral movement of the aircraft is outwards from the center of the turn. A turn where the lateral movement of the aircraft is toward the center of a turn is generally just termed a slip. Slip-skid symbol 703 is positioned relative to aircraft reference symbol 701, but is displaced by the lateral acceleration of the aircraft. For example, as illustrated the aircraft is not experiencing lateral acceleration and slip-skid symbol 703 is positioned relative to aircraft reference symbol 701. Referring now to FIG. 8, the aircraft is experiencing lateral acceleration and slip-skid symbol 703 is displaced. Thus, slip/skid guidance information is simply communicated to the pilot of an aircraft who can then make appropriate adjustments.

Figure 9:
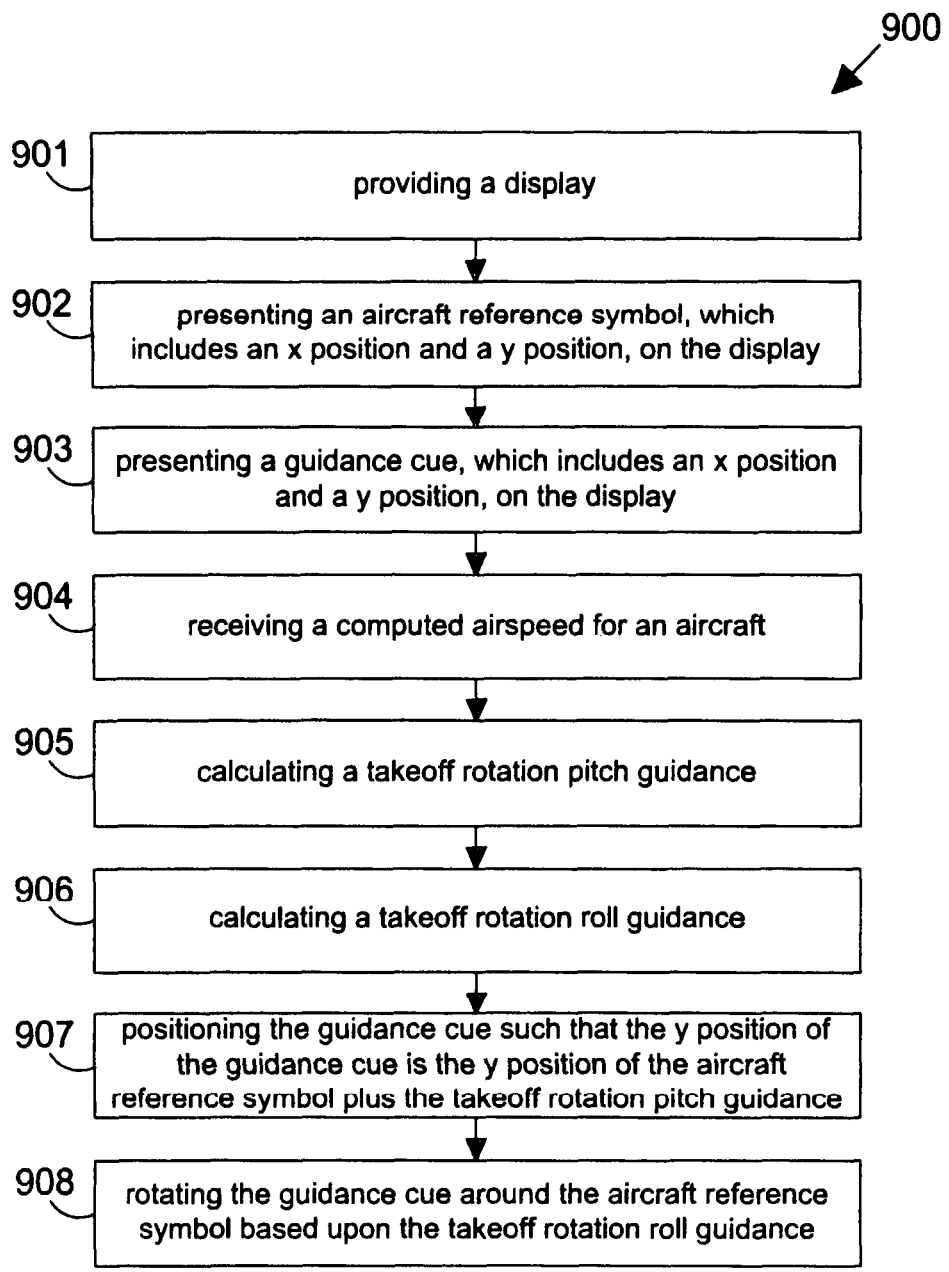
FIG. 9 is a flow chart illustrating a method of providing takeoff rotation guidance, in accordance with an exemplary embodiment of the present invention.

Referring now to FIG. 9; a method 900 of providing takeoff rotation guidance, in accordance with an exemplary embodiment of the present invention, is shown. In step 901, a display is provided. The display may be incorporated into a HGS. The display may comprise a HUD. In step 902, an aircraft reference symbol, which includes an x position and a y position, is presented on the display. In step 903, a guidance cue, which includes an x position and a y position, is presented on the display. In step 904, a computed airspeed for an aircraft is received. In step 905, a takeoff rotation pitch guidance is calculated. In step 906, a takeoff rotation roll guidance is calculated. In step 907, the guidance cue is positioned such that the y position of the guidance cue is the y position of the aircraft reference symbol plus the takeoff rotation pitch guidance. In step 908, the guidance cue is rotated around the aircraft reference symbol based upon the takeoff rotation roll guidance.

Figure 10:
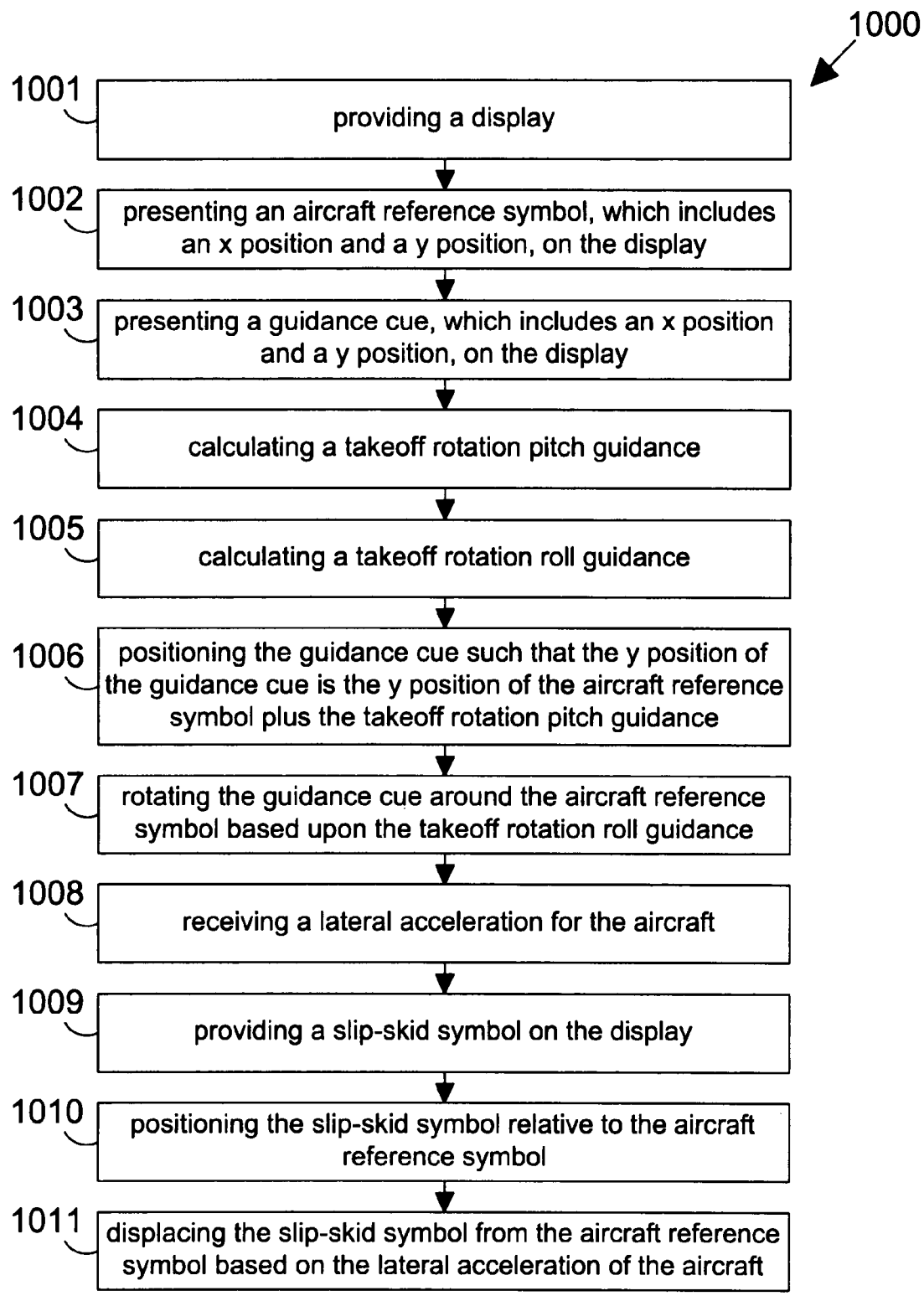
FIG. 10 is a flow chart illustrating a method of providing takeoff rotation guidance, in accordance with an alternative embodiment of the present invention.

Referring now to FIG. 10; a method 1000 of providing takeoff rotation guidance, in accordance with an alternative embodiment of the present invention, is shown. In step 1001, a display is provided. The display may be incorporated into a HGS. The display may comprise a HUD. In step 1002, an aircraft reference symbol, which includes an x position and a y position, is presented on the display. In step 1003, a guidance cue, which includes an x position and a y position, is presented on the display. In step 1004, a takeoff rotation pitch guidance is calculated. In step 1005, a takeoff rotation roll guidance is calculated. In step 1006, the guidance cue is positioned such that the y position of the guidance cue is the y position of the aircraft reference symbol plus the takeoff rotation pitch guidance. In step 1007, the guidance cue is rotated around the aircraft reference symbol based upon the takeoff rotation roll guidance. In step 1008, a lateral acceleration is received for the aircraft. In step 1009, a slip-skid symbol is provided on the display. In step 1010, the skip-skid symbol is positioned relative to the aircraft reference symbol. In step 1011, the skip-skid symbol is displaced based upon the lateral acceleration of the aircraft.

Figure 11:
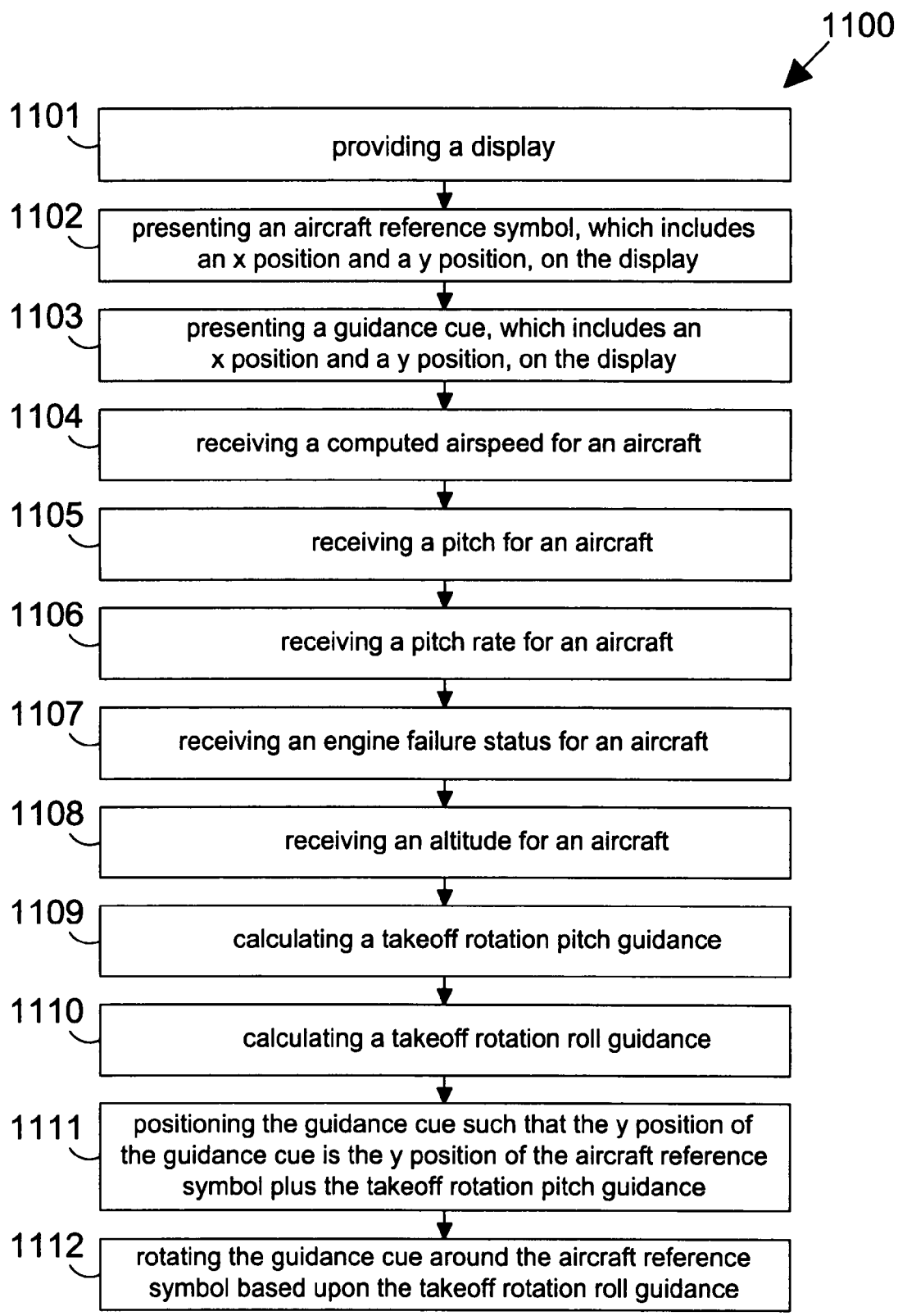
FIG. 11 is a flow chart illustrating a method of providing takeoff rotation guidance, in accordance with an alternative embodiment of the present invention.

Referring now to FIG. 11; a method 1100 of providing takeoff rotation guidance, in accordance with an exemplary embodiment of the present invention, is shown. In step 1101, a display is provided. The display may be incorporated into a HGS. The display may comprise a HUD. In step 1102, an aircraft reference symbol, which includes an x position and a y position, is presented on the display. In step 1103, a guidance cue, which includes an x position and a y position, is presented on the display. In step 1104, a computed airspeed for an aircraft is received. In step 1105, a pitch for the aircraft is received. In step 1106, a pitch rate for the aircraft if received. In step 1107, an engine failure status for the aircraft is received. In step 1108, an altitude for the aircraft above a terrain is received. In step 1109, a takeoff rotation pitch guidance is calculated. In step 1110, a takeoff rotation roll guidance is calculated. In step 1111, the guidance cue is positioned such that the y position of the guidance cue is the y position of the aircraft reference symbol plus the takeoff rotation pitch guidance. In step 1112, the guidance cue is rotated around the aircraft reference symbol based upon the takeoff rotation roll guidance.

Figure 12:
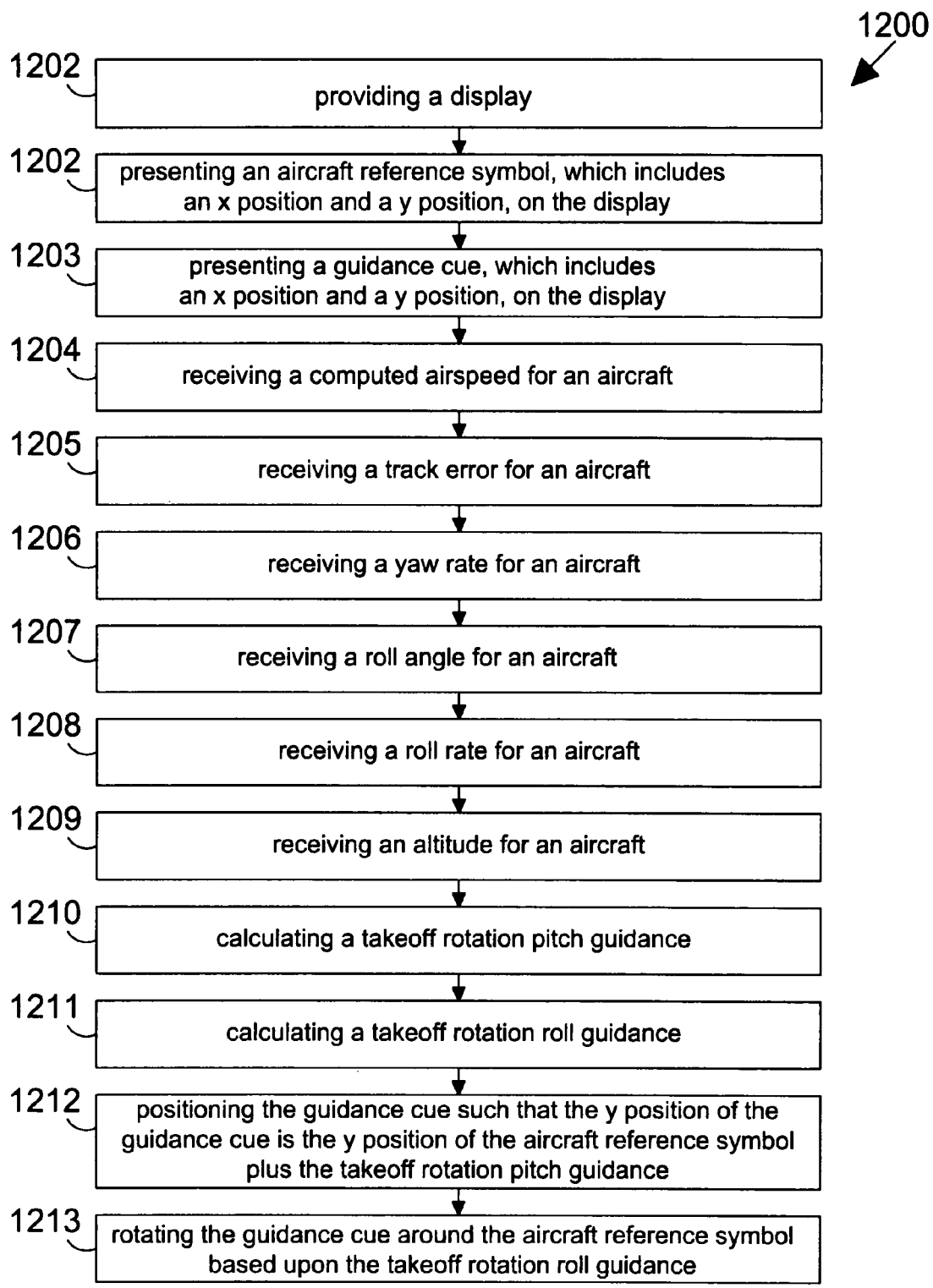
FIG. 12 is a flow chart illustrating a method of providing takeoff rotation guidance, in accordance with an alternative embodiment of the present invention.

Referring now to FIG. 12; a method 1200 of providing takeoff rotation guidance, in accordance with an exemplary embodiment of the present invention, is shown. In step 1201, a display is provided. The display may be incorporated into a HGS. The display may comprise a HUD. In step 1202, an aircraft reference symbol, which includes an x position and a y position, is presented on the display. In step 1203, a guidance cue, which includes an x position and a y position, is presented on the display. In step 1204, a computed airspeed for an aircraft is received. In step 1205, a track error for the aircraft is received. In step 1206, a yaw rate for the aircraft if received. In step 1207, a roll angle for the aircraft is received. In step 1208, a roll rate for the aircraft is received. In step 1209, an altitude for the aircraft above a terrain is received. In step 1210, a takeoff rotation pitch guidance is calculated. In step 1211, a takeoff rotation roll guidance is calculated. In step 1212, the guidance cue is positioned such that the y position of the guidance cue is the y position of the aircraft reference symbol plus the takeoff rotation pitch guidance. In step 1213, the guidance cue is rotated around the aircraft reference symbol based upon the takeoff rotation roll guidance.

Figure 13:
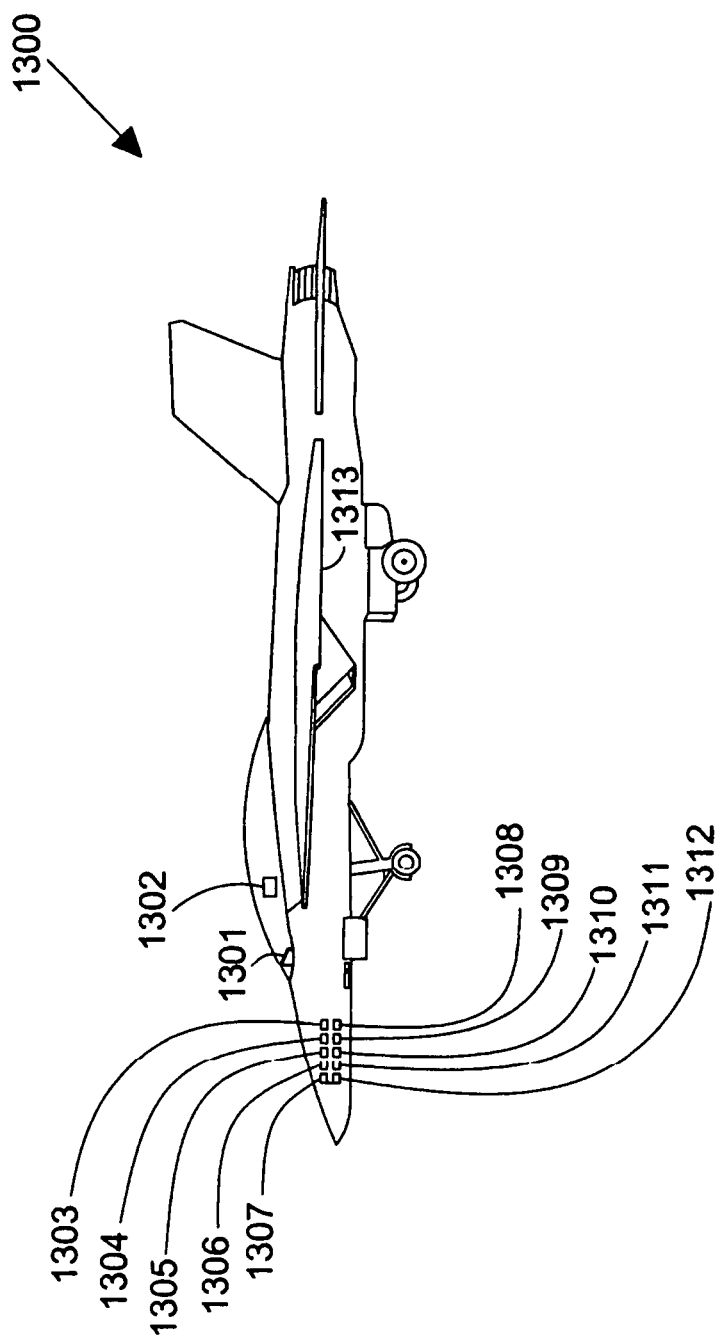
FIG. 13 is a diagram illustrating a system for providing takeoff rotation guidance, in accordance with an alternative embodiment of the present invention.

Referring now to FIG. 13, a system 1300 for providing takeoff rotation guidance for an aircraft, in accordance with an alternative embodiment of the present invention, is shown. The system 1300 includes an aircraft 1313, a display 1301, and a processing unit 1302. The system 1300 may include a lateral acceleration sensor 1303 for receiving the lateral acceleration for the aircraft. The system 1300 may include an airspeed sensor 1304 for receiving the computed airspeed for the aircraft. The system 1300 may include a pitch sensor 1305 for receiving the pitch for the aircraft. The system 1300 may include a pitch rate sensor 1306 for receiving the pitch rate for the aircraft. The system 1300 may include an engine failure sensor 1307 for receiving the engine failure status for the aircraft. The system 1300 may include an altitude sensor 1308 for receiving the altitude of the aircraft. The system 1300 may include a track error sensor 1309 for receiving the track error for the aircraft. The system 1300 may include a yaw rate sensor 1310 for receiving the yaw rate for the aircraft. The system 1300 may include a roll angle sensor 1311 for receiving the roll angle for the aircraft. The system 1300 may include a roll rate sensor 1312 for receiving the roll rate for the aircraft. An aircraft reference symbol and a guidance cue, the guidance cue being positioned in relation to the aircraft reference symbol based on a takeoff rotation pitch guidance and a takeoff rotation roll guidance calculated by processing unit 1302, are presented on display 1301.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A HGS (Head-up Guidance System) device for displaying suggested pitch and roll command guidance to a pilot of an aircraft during a takeoff roll, a rotation, and an initial climbout, comprising:
    a HUD (Head-up Display), which includes an aircraft reference symbol and a takeoff rotation guidance cue; and
    a processing unit operatively connected to the HUD for calculating and displaying on the HUD the takeoff rotation guidance cue, the takeoff rotation guidance cue indicating a suggested takeoff rotation pitch command and a suggested takeoff rotation roll command to the pilot;
    wherein, as displayed on the HUD, the aircraft reference symbol has an x position and a y position indicating aircraft current path, the takeoff rotation guidance cue has an x position equal to the reference symbol x position, and a y position equal to the y position of the aircraft symbol plus the suggested takeoff rotation pitch command, the suggested takeoff rotation pitch command based at least on a pitch command limit, a pitch command ramp, and an engine failure factor, and the guidance cue is rotated about the aircraft reference symbol indicating the suggested takeoff rotation roll command, the suggested takeoff rotation roll command based at least on a roll command limit, a track error, a track error gain, a yaw rate, and a yaw rate gain.

2. The HGS device as claimed in claim 1, wherein the HGS device further comprises a lateral acceleration sensor operatively connected to the processing unit for receiving a lateral acceleration for the aircraft, the HUD further includes a slip-skid symbol which is positioned relative to the aircraft reference symbol, and the slip-skid symbol is displaced laterally from the aircraft reference symbol based upon the lateral acceleration of the aircraft.

3. The HGS device as claimed in claim 1, wherein the HGS further comprises an airspeed sensor operatively connected to the processing unit for receiving a computed airspeed for the aircraft and the suggested takeoff rotation pitch command is zero when the computed airspeed is less than a takeoff rotation speed.

4. The HGS device as claimed in claim 1, wherein the HGS further comprises an airspeed sensor operatively connected to the processing unit for receiving a computed airspeed for the aircraft and the suggested takeoff rotation roll guidance is zero when the computed airspeed is less than a takeoff liftoff speed.

5. The HGS device as claimed in claim 1, wherein calculating and displaying the takeoff rotation guidance cue at the y position further comprises:
    an airspeed sensor operatively connected to the processing unit for receiving a computed airspeed for the aircraft,
    a pitch sensor operatively connected to the processing unit for receiving a pitch for the aircraft,
    a pitch rate sensor operatively connected to the processing unit for receiving a pitch rate for the aircraft,
    an engine failure sensor operatively connected to the processing unit for receiving an engine failure status for the aircraft, and
    an altitude sensor operatively connected to the processing unit for receiving an altitude for the aircraft above a terrain; and
    when the computed airspeed is greater than a takeoff rotation speed and the altitude of the aircraft above the terrain is approximately less than a climbout altitude the suggested takeoff rotation pitch command is calculated by:
        generating a suggested pitch rate;
        multiplying the suggested pitch rate by an engine failure factor to obtain a product;
        subtracting the pitch of the aircraft from the product to obtain a difference;
        subtracting the pitch rate of the aircraft from the difference to obtain a y position of the takeoff rotation guidance cue; and
        displaying on the HUD said takeoff rotation guidance cue at the y position.

6. The HGS device as claimed in claim 1, wherein the calculating and displaying the suggested takeoff rotation roll guidance further comprises:
    an airspeed sensor operatively connected to the processing unit for receiving a computed airspeed for the aircraft,
    a track error sensor operatively connected to the processing unit for receiving a track error for the aircraft,
    a yaw rate sensor operatively connected to the processing unit for receiving a yaw rate for the aircraft,
    a roll angle sensor operatively connected to the processing unit for receiving a roll angle for the aircraft,
    a roll rate sensor operatively connected to the processing unit for receiving a roll rate for the aircraft, and an
    altitude sensor operatively connected to the processing unit for receiving an altitude for the aircraft above a terrain; and
    when the computed airspeed is greater than a takeoff liftoff speed and the altitude of the aircraft above the terrain is approximately less than a climbout altitude the suggested takeoff rotation roll guidance is calculated by:
        subtracting the yaw rate of the aircraft from the track error of the aircraft to obtain a roll command limit;
        subtracting the actual roll angle of the aircraft from the roll command limit to obtain a roll command;
        subtracting the actual roll rate of the aircraft from the roll command to obtain the suggested takeoff rotation roll guidance; and
        rotating, as displayed on the HUD, the rotation guidance cue about the aircraft reference symbol at an angle equal to the suggested takeoff rotation roll guidance.

7. A method of displaying suggested pitch and roll command guidance to a pilot of an aircraft during a takeoff roll, a rotation, and an initial climbout, comprising the steps of:
    receiving a plurality of inputs within a processing unit, the plurality of inputs associated with the aircraft during the takeoff roll;
    generating guidance symbols within the processing unit, the guidance symbols including at least an aircraft reference symbol and a takeoff rotation guidance cue;
    presenting, via the processing unit, the aircraft reference symbol on a Head-up display (HUD), the reference symbol includes an x position and a y position, on the HUD;
    presenting, via the processing unit, the takeoff rotation guidance cue on the HUD, the guidance includes an x position, a y position, and is configured to rotate about the aircraft reference symbol on the HUD;

calculating, via the processing unit, a suggested takeoff rotation pitch command, the suggested takeoff rotation pitch command based at least on a pitch command limit, a pitch command ramp, and an engine failure factor;

calculating, via the processing unit, a suggested takeoff rotation roll command, the suggested takeoff rotation roll command based at least on a roll command limit, a track error, a track error gain, a yaw rate, and a yaw rate gain;

positioning, via the processing unit, the guidance cue on the HUD such that the x position of the guidance cue is equal to the x position of the aircraft reference symbol; and positioning, via the processing unit, the guidance cue on the HUD such that the y position of the guidance cue is the y position of the aircraft reference symbol plus the suggested takeoff rotation pitch command; and rotating, via the processing unit, as positioned on the HUD, the guidance cue about the aircraft reference symbol at an angle equal to the suggested takeoff rotation roll command.

8. The method of claim 7, further comprising the steps of:
receiving a lateral acceleration for the aircraft;
providing a slip-skid symbol on the HUD;
positioning the slip-skid symbol relative to the aircraft reference symbol; and
displacing the slip-skid symbol laterally from the aircraft reference symbol based on the lateral acceleration of the aircraft.

9. The method of claim 7, wherein positioning the guidance cue on the HUD further comprises the step of:
receiving a takeoff rotation speed for the aircraft;
receiving a computed airspeed for the aircraft;
limiting the suggested takeoff rotation pitch command to zero when the computed airspeed is less than the takeoff rotation speed.

10. The method of claim 7, wherein rotating, as positioned on the HUD, the guidance cue about the aircraft reference symbol further comprises the steps of:
receiving a takeoff liftoff speed for the aircraft;
receiving a computed airspeed for the aircraft;
limiting the suggested takeoff rotation roll guidance to zero when the computed airspeed is less than the takeoff liftoff speed.

11. The method of claim 7, wherein positioning of the guidance cue on the HUD further comprising the steps of:
receiving a computed airspeed for the aircraft;
receiving a pitch for the aircraft;
receiving a pitch rate for the aircraft;
receiving an engine failure status for the aircraft; and
receiving a track error for the aircraft;
receiving a yaw rate for the aircraft;
receiving a roll angle for the aircraft;
receiving an roll rate for the aircraft; and
receiving an altitude for the aircraft above a terrain;
when the computed airspeed is greater than a takeoff rotation speed and the altitude of the aircraft above the terrain is approximately less than a climbout altitude the calculation of the displayed position of the suggested takeoff rotation pitch command as displayed on the HUD is based on a suggested pitch rate, the engine failure status of the aircraft, the pitch of the aircraft, and the pitch rate of the aircraft; and when the computed airspeed is greater than a takeoff liftoff speed and the altitude of the aircraft above the terrain is approximately less than the climbout altitude the calculation of the angle of rotation of the guidance cue about the aircraft reference symbol as displayed on the HUD is based on the track error of the aircraft, the yaw rate of the aircraft, the roll angle of the aircraft, and the roll rate of the aircraft;

displaying, on the HUD, the guidance cue at the calculated x axis position, at the calculated y axis position, and rotating the guidance cue about the aircraft reference symbol at an angle equal to the calculated angle of rotation of the guidance cue.

12. The method of claim 7, wherein calculating and display of the y axis position of the guidance cue further comprising the steps of:
receiving a computed airspeed for the aircraft;
receiving a pitch for the aircraft;
receiving a pitch rate for the aircraft;
receiving an engine failure status for the aircraft; and
receiving an altitude for the aircraft above a terrain;
when the computed airspeed is greater than a takeoff rotation speed and the altitude of the aircraft above the terrain is approximately less than a climbout altitude the step of calculating and display of the y axis position of the guidance cue comprises the steps of:
generating a suggested pitch rate;
multiplying the suggested pitch rate by an engine failure factor to obtain a product;
subtracting the pitch of the aircraft from the product to obtain a difference;
subtracting the pitch rate of the aircraft from the difference to obtain a y position of the takeoff rotation guidance cue; and
displaying on the HUD said takeoff rotation guidance cue at the y position.

13. The method of claim 7, wherein the calculation and display of the suggested takeoff rotation roll guidance further comprising the steps of:
receiving a computed airspeed for the aircraft;
receiving a track error for the aircraft;
receiving a yaw rate for the aircraft;
receiving a roll angle for the aircraft;
receiving an roll rate for the aircraft; and
receiving an altitude for the aircraft above a terrain;
when the computed airspeed is greater than a takeoff liftoff speed and the altitude of the aircraft above the terrain is approximately less than a climbout altitude the step of calculating and display of the suggested takeoff rotation roll guidance comprises the steps of:
subtracting the yaw rate of the aircraft from the track error of the aircraft to obtain a roll command limit;
subtracting the actual roll angle of the aircraft from the roll command limit to obtain a roll command;
subtracting the actual roll rate of the aircraft from the roll command to obtain the suggested takeoff rotation roll guidance; and
rotating, as displayed on the HUD, the guidance cue about the aircraft reference symbol at an angle equal to the suggested takeoff rotation roll guidance.

14. A system for displaying suggested pitch and roll command guidance to a pilot of an aircraft during a takeoff roll, a rotation, and an initial climbout, comprising:
a Head-up display (HUD), the HUD configured for installation on board the aircraft, the HUD including, an aircraft reference symbol and a guidance cue; and
a processing unit for calculating a suggested takeoff rotation pitch command and a suggested takeoff rotation roll command;
wherein the aircraft reference symbol has an x position and a y position, the guidance cue has an x position, a y position, and is configured to rotate about the aircraft reference symbol on the HUD, the x position of the guidance cue is equal to the x position of the aircraft reference symbol, the y position of the guidance cue is the y position of the aircraft reference symbol plus the suggested takeoff rotation pitch command, the suggested takeoff rotation pitch command based at least on a pitch command limit, a pitch command ramp, and an engine failure factor, and the guidance cue is rotated about the aircraft reference symbol based upon the suggested takeoff rotation roll command, the suggested takeoff rotation roll command based at least on a roll command limit, a track error, a track error gain, a yaw rate, and a yaw rate gain.

15. The system as claimed in claim 14, wherein the system further comprises a lateral acceleration sensor for receiving a lateral acceleration for the aircraft, the display further includes a slip-skid symbol which is positioned relative to the aircraft reference symbol, and the slip-skid symbol is displaced laterally from the aircraft reference symbol based upon the lateral acceleration of the aircraft.

16. The system as claimed in claim 14, wherein the system further comprises an airspeed sensor for receiving a computed airspeed for the aircraft and the suggested takeoff rotation pitch command is zero when the computed airspeed is less than a takeoff rotation speed.

17. The system as claimed in claim 14, wherein the system further comprises an airspeed sensor for receiving a computed airspeed for the aircraft and the suggested takeoff rotation roll guidance is zero when the computed airspeed is less than a takeoff liftoff speed.

18. The system as claimed in claim 14, wherein the system further comprises
- an airspeed sensor for receiving a computed airspeed for the aircraft,
- a pitch sensor for receiving a pitch for the aircraft,
- a pitch rate sensor for receiving a pitch rate for the aircraft,
- an engine failure sensor for receiving an engine failure status for the aircraft, and
- an altitude sensor for receiving an altitude for the aircraft above a terrain; and
- when the computed airspeed is greater than a takeoff rotation speed and the altitude of the aircraft above the terrain is approximately less than a climbout altitude the suggested takeoff rotation pitch command is calculated by:
- generating a suggested pitch rate;
- multiplying the suggested pitch rate by an engine failure factor to obtain a product;
- subtracting the pitch of the aircraft from the product to obtain a difference;
- subtracting the pitch rate of the aircraft from the difference to obtain a y position of the takeoff rotation guidance cue; and
- displaying on the HUD said takeoff rotation guidance cue at the y position.

19. The system as claimed in claim 14, wherein the system further comprises an airspeed sensor for receiving a computed airspeed for the aircraft, a track error sensor for receiving a track error for the aircraft, a yaw rate sensor for receiving a yaw rate for the aircraft, a roll angle sensor for receiving a roll angle for the aircraft, a roll rate sensor for receiving a roll rate for the aircraft, and an altitude sensor for receiving an altitude for the aircraft above a terrain; and when the computed airspeed is greater than a takeoff liftoff speed and the altitude of the aircraft above the terrain is approximately less than a climbout altitude the suggested takeoff rotation roll guidance is calculated by:
- subtracting the yaw rate of the aircraft from the track error of the aircraft to obtain a roll command limit;
- subtracting the actual roll angle of the aircraft from the roll command limit to obtain a roll command;
- subtracting the actual roll rate of the aircraft from the roll command to obtain the suggested takeoff rotation roll guidance; and
- rotating, as displayed on the HUD, the guidance cue about the aircraft reference symbol at an angle equal to the suggested takeoff rotation roll guidance.

* * * * *